United States Patent [19]

Robson

[11] 4,412,363

[45] Nov. 1, 1983

[54] APPARATUS FOR COLLECTING AND DISTRIBUTING POLLEN

[76] Inventor: Charles H. Robson, 6241 S. 30th St., Phoenix, Ariz. 85040

[21] Appl. No.: 290,750

[22] Filed: Aug. 7, 1981

[51] Int. Cl.³ .................................................. A01K 47/06
[52] U.S. Cl. .................................................................. 6/4 R
[58] Field of Search ............................. 6/1, 4 R, 12 R

[56] References Cited

U.S. PATENT DOCUMENTS

| | | | |
|---|---|---|---|
| 3,343,186 | 9/1967 | Dunand | 6/4 R X |
| 3,995,338 | 12/1976 | Kauffeld | 6/4 |
| 4,007,504 | 2/1977 | West | 6/4 R |
| 4,135,265 | 1/1979 | Van de Kerkof | 6/1 |
| 4,291,424 | 9/1981 | Angelis | 6/4 R |

FOREIGN PATENT DOCUMENTS 472201 1/1976 Australia .
1223455 6/1960 France ......................................... 6/4 R

OTHER PUBLICATIONS

"Farmnote", S. R. Chambers, Mar. 1977.
"C.A.C. Pollen Trap", M. V. Smith, Jun. 1965.
"Making and Using a Pollen Trap", E. R. Jaycox, Mar. 1977.

*Primary Examiner*—Robert P. Swiatek
*Attorney, Agent, or Firm*—Joseph H. Roediger

[57] ABSTRACT

Pollen collecting apparatus for placement at different levels within a segmented bee colony. The apparatus includes a centrally located pollen trap with an overlying scraper and pollen tray wherein both trapping, non-trapping and pollination enhancing operations can be performed by changing the position or orientation of the scraper without removing the apparatus from the colony.

14 Claims, 9 Drawing Figures

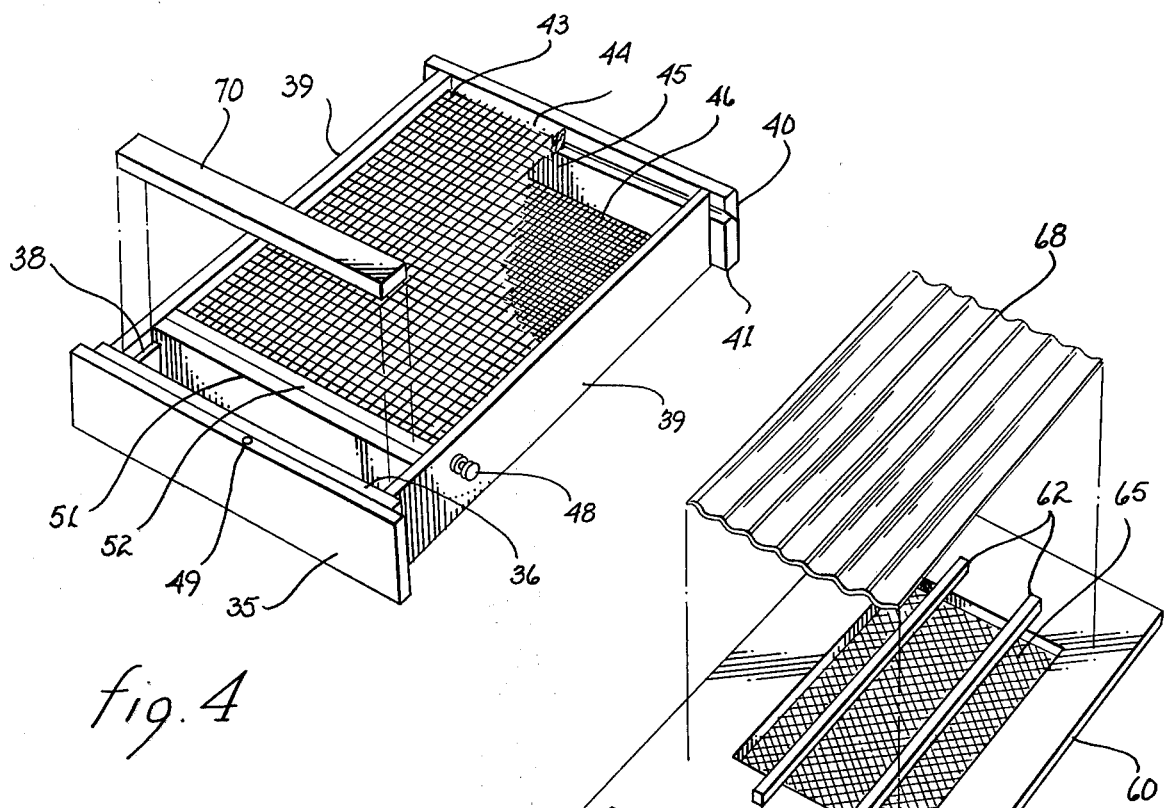
fig. 4
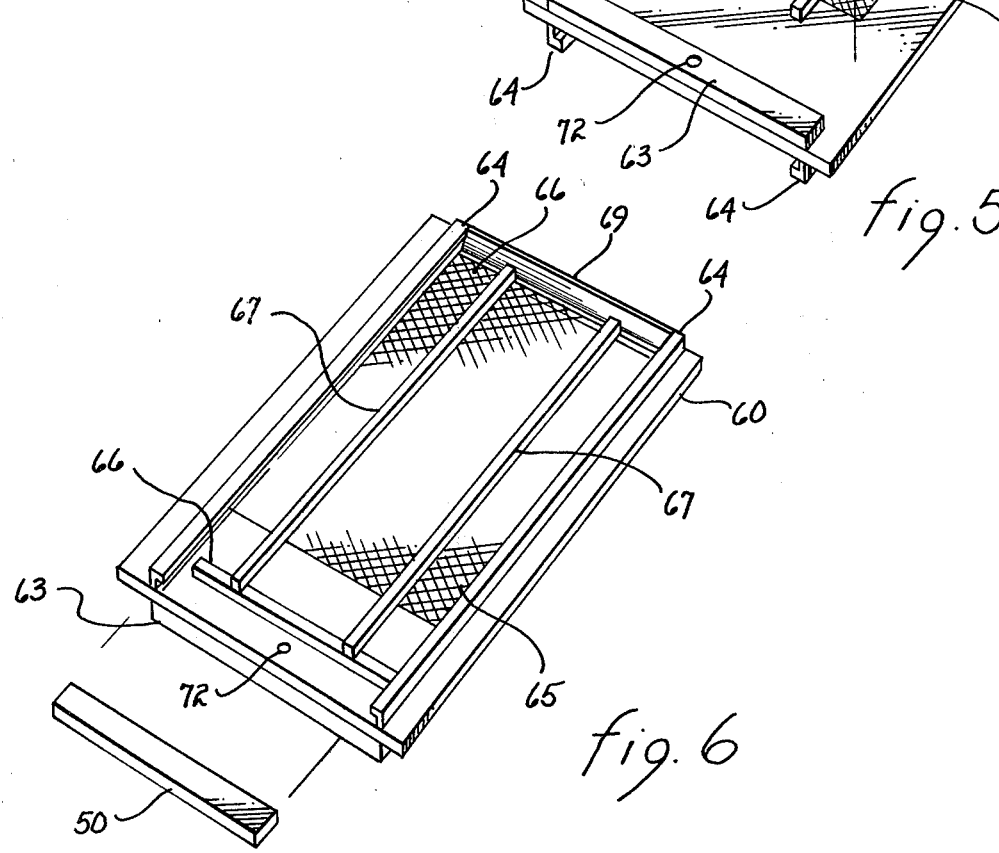
fig. 5
fig. 6

APPARATUS FOR COLLECTING AND DISTRIBUTING POLLEN

BACKGROUND OF THE INVENTION

This invention relates to apparatus utilized for the trapping of pollen in a honeybee colony and for enhancing the pollination activities of the bees of the colony.

Beekeepers recognize that bees depend on honey for their carbohydrate food component and pollen for their protein requirements. Typically, these items are collected and later made available to the bee colony during periods of short supply. In addition, trapping of pollen has been utilized to determine the types of plants visited by the bees and to study the relative importance and yields of plant types in a given area.

Recently, the proteinaceous character of pollen has been recognized as making pollen highly beneficial to the human diet. This recognition has generated increasing interest in ways to efficiently and effectively trap and harvest pollen on a commercial basis. To this end, a variety of different pollen traps have been described in the literature and tested in the bee colonies. An improved pollen trap is described in my co-pending U.S. patent application Ser. No. 236,916 filed Feb. 23, 1981, entitled Improved Pollen Trap and now U.S. Pat. No. 4,351,974.

A pollen trap is a device placed in the travel path of honey bees returning to their colony after foraging. The pollen-collecting bees carry the bulk of the pollen in pouches on their legs. To effect removal of pollen from the bees, one or more mesh screens are placed in their travel path. As the bees crawl through the screen the pollen is dislodged from their legs and is collected in a container made inaccessible to the bees by a fine mesh covering.

The collection of pollen on a large scale commercial basis requires that effective pollen trapping be accomplished by a structure that is compatible with commercial equipment presently utilized and is multi-functional so that it does not require dismantling of the colony during normal operation. Thus, it is highly desirable that a trap be capable of being utilized at the bottom, top or in a mid-range position in a bee colony and to have trapping and non-trapping capabilities in each position. Further, the use of a pollen trap should minimize any disturbance of the honeybee colony or the normal flight path of the bee. In addition, it is recommended that the trap employed interfere as little as practical with the required ventilation pattern within the bee colony and particularly within the region surrounding the container of trapped pollen.

One general type of pollen trap known to the industry requires the structure to be placed outside the bee colony. An example of this type is described in U.S. Pat. No. 3,995,338 wherein adjacent pollen and trash containers are positioned beneath spaced vertical screens and located outside the colony. A disadvantage common to external traps is that the pollen is exposed to adverse climatic conditions, in particular to moisture which can render the accumulated pollen unusable. Also, outside traps must be removed from the area by the operator during periods in which the crops are being sprayed for pesticide or weed control.

Pollen traps which can be included within the bee colony and are thus protected from the adverse climatic conditions and various chemical substances in the area are preferred for commercial use. As a result, a number of bottom traps have been described in the literature. The typical manner of providing for the bottom trapping of pollen is to incorporate a pollen scraping screen at or proximate to the bee entrance of the colony with a trapping container incorporated in the base of the colony. In structures wherein the trapping container is positioned just below the bee entryway the pollen is likely to be rendered unsuitable for further use or sale as a result of either exposure to the environment or lack of adequate ventilation. In many bottom traps, the pollen is subject to contamination by external sources or by trash generated within the colony by the bees. Also, small animals and insects are often able to invade the trapping container of modified base structure colonies.

While the trapping of pollen for removal from the bee colony is efficiently and effectively performed in the apparatus described in my aforementioned U.S. patent application, that invention is directed to trapping and non-trapping modes of operation wherein the collection of pollen for removal is of prime concern. The pollination of agricultural crops by the bees when the prior apparatus was placed in its non-trapping mode was essentially undisturbed as intended. The present invention is directed to the enhancing of the distribution of pollen by the bees while retaining the advantages of my prior trapping apparatus. By increasing the efficiency of the pollen distributing function of the bees in the colony, crop yields are increased and the time required for pollination is decreased.

Accordingly, the present invention is directed to the provision of pollen collecting apparatus that can be included in the bee colony at top, intermediate or bottom trapping positions within the colony to provide improved crop pollination. The present structure conforms to the dimensions of the conventional colony and thus can be positioned on and employed with the colony base to elevate the pollen trapping site from ground level. The trapping and distribution of pollen takes place within the structure so as to provide protection from adverse environmental conditions. In addition, the present apparatus permits the beekeeper to engage in either trapping, non-trapping or pollination operations without requiring removal of the structure from the colony.

SUMMARY OF THE INVENTION

The present invention is directed to pollen collecting apparatus which is dimensioned to fit within a conventional segmented bee colony and permits the beekeeper to engage in the trapping, non-trapping or pollination enhancing modes of operation of different levels within the colony.

The apparatus includes a housing member which is dimensioned to fit in the stack of hives which form a segmented bee colony. The housing includes a drawer slidably mounted in the front wall thereof. A pollen trap container is centrally mounted within the drawer so as to be spaced from the front and back members of the housing when the drawer is inserted therein.

The pollen trap container has a foraminous upper surface containing a large number of small openings through which pollen can pass. The openings in this surface are smaller than the size of the bee so that access to the interior of the container is denied to the bees. A scraper means, including typically two mesh screens mounted in an offset manner with respect to each other and a pollen tray spaced adjacent one side thereof, is mounted within the housing in spaced overlying relationship to the upper surface of the pollen trap. The scraper means can be moved between first and second positions in the housing and can also be withdrawn, turned over and reversed for reinsertion into the housing.

When in the first position, the scraper means extends between the front and back walls of the housing so that any bees traveling upward must pass through the scraper means and around the pollen trap thereby dislodging the pollen carried on their bodies. In the second position, the scraper means is partially withdrawn from the housing so that the rear edge thereof is spaced from the back wall of the housing. This spacing permits the bees within the colony to bypass the scraper screens and the drawer via this rear vertical passageway. Also, the scraper means is provided with an access control member mounted near the rear edge thereof and on the opposing side from the tray. This member extends downwardly from the scraper means to the pollen trap when the scraper means is in the second position. As a result, the rear vertical passageway does not communicate with the region between the upper surface of the pollen trap and the scraper screens.

The scraper means is further provided with an entry blocking member affixed to one side and mounted near its front edge. The front edge portion of the opposing side of the scraper means is adapted to receive a removable blocking bar when positioned therein. The combination of the fixed and removable blocking members is utilized to control the access paths of the bees to the colony when the scraper means is in the first and second positions and in the normal or rotated positions. The rotation of the scraper means in combination with the fixed and removable front housing wall blocking members and the movable scraper means permit this pollen trap to be utilized in both the trapping and non-trapping modes of operation without requiring the disassembling of the conventional segmented bee colony.

In addition, the scraper means is reversible in that the edge containing the entry blocking member can be inserted first into the housing with the access control member thus being located at the front wall of the housing. A pollen tray is mounted on one side of the scraper means closely spaced adjacent the screen. This tray is provided with channels extending in the direction between the front and rear walls of the housing. When the scraper means is in its reversed and rotated position to place the pollen tray between the screen and drawer, the bees ingress and egress paths to the colony require them to travel along the channels of the scraper tray. On the way into the hive, pollen is collected from the bees in the channels of the tray rather than in the drawer. As the bees leave the hive they must travel along these pollen-filled channels thereby picking up fresh pollen on their bodies for distribution in the agricultural fields where they have been placed to work.

In operation, the present invention can be placed on the colony supporting base with the pollen gathering function provided for bees entering from the base entryway. The removable blocking bar is moved to the base entryway from the top of the scraper means for non-trapping operation. For pollination enhancing operations, the scraper means is withdrawn, rotated, reversed and reinserted so that the pollen tray is located between the screen and pollen drawer.

As a mid-position trap, the scraper means is set in the partially withdrawn or second position. As a result, access to the colony is provided between the drawer and scraper means. A removable blocking member is placed behind the front of the drawer and in front of the pollen trap. In addition, the base entryway is blocked by an additional blocking bar inserted into the base entry opening. The non-trapping operation in this mid-position requires the removal, rotation, and replacement of the scraper means in the housing. The base entry need not be blocked for this mode of operation. For the pollination enhancing mode, the scraper means is oriented with the access control member at the top front of the housing, placed in the partially withdrawn second position and both the base entry and the front passageway of the pollen drawer are blocked.

When used as a top trap, the cover for the top hive in the colony is placed on the open housing of the invention and the scraper means is positioned in the second position. The removable blocking bar is again inserted into the drawer. The base entry is also blocked as mentioned in connection with the middle trap operations. To provide non-trapping operation in the top trap position, the scraper means is moved to its first position and the removable blocking bar is removed from behind the front wall of the drawer. The pollination enhancing operation requires the same orientation of the scraper means and blocking members is the case as with the middle of the colony location.

Thus, the present pollen trap is capable of performing the trapping, non-trapping and pollination enhancing operations when positioned by the beekeeper at different levels in the colony. The pollen is collected in a central location either on the channelized pollen tray or in the pollen drawer within the colony and spoilage or contamination due to outside conditions is essentially eliminated. Also, the construction of the present invention has been found to provide the necessary ventilation to retard mold, mildew and other forms of spoilage.

Further features and advantages of the invention will become more readily apparent from the following detailed description of a preferred embodiment when taken in conjunction with the accompanying drawings.

BRIEF DESCRIPTION OF THE DRAWINGS

FIG. 4 is a perspective view of the drawer and pollen container of this embodiment.

FIG. 5 is a perspective view of the scraper means showing the pollen tray.

FIG. 6 is a perspective view of the opposing side of the scraper means showing the access control member.

DESCRIPTION OF THE PREFERRED EMBODIMENT

Figure 1:
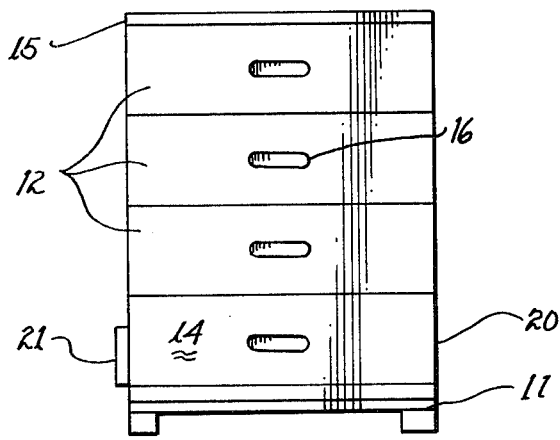
FIG. 1 shows a side view of the present invention utilized in the bottom position of a segmented bee colony.

Referring now to FIG. 1, a segmented bee colony is shown including a supporting base 11 with a number of hive and honey collecting supers or segments 12 thereon capped with a lid 15. The individual segments are provided with recessed gripping areas 16 to facilitate stacking and disassembly prior to moving the colony. In FIG. 1, the present invention 14 is positioned at the bottom of the segmented bee colony in the trapping position.

The use of the segmented bee colony with the stacked supers and hives is common practice in the industry. The individual hives and supers are open at top and bottom and are adapted for use with elevating base members which provide a bottom or near ground-level bee entry to the colony and top lid members which normally do not permit access to the colony from the outside.

Figure 3:
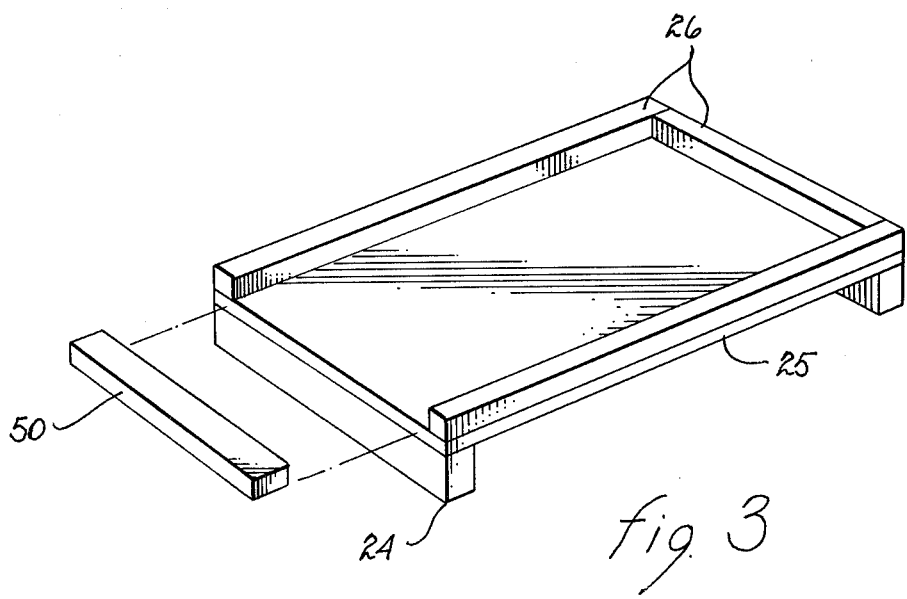
FIG. 3 is a perspective view of a colony supporting base.

Since all segments of a colony communicate internally, the single bottom or base entryway is the typical manner of providing access to the colony during normal operation. In different regions of the country, it is common to affix the base to the bottom super in the colony thereby requiring the invention to be used in a middle or top position. The elevating base structure is shown in FIG. 3 including supporting legs 24, which rest on the ground and elevate the base board 25 from ground level. The three edge supports 26 are mounted on the base board so as to provide the bee entry opening at one end thereof.

Figure 2:
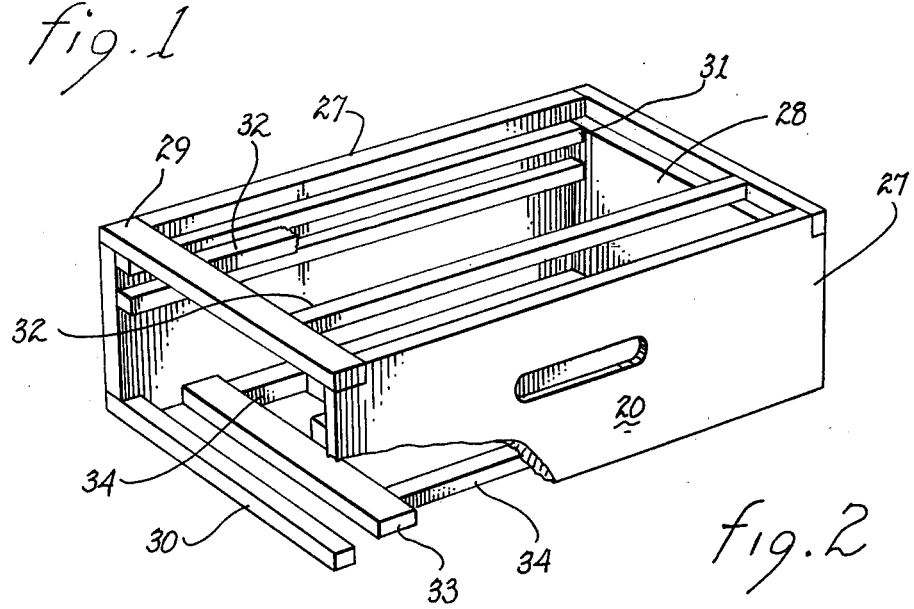
FIG. 2 is a perspective view in partial section of the housing member of the described embodiment.

The housing of FIG. 2 is placed directly upon the elevating base structure for use as a bottom position pollen trap. The housing formed with opposing side walls 27, back wall 28 and front wall supports 29 and 30 is open on the top and bottom for communication with other segments of the bee colony. The front wall supports are spaced to permit the insertion of a drawer and an overlying scraper tray within the housing.

The housing 20 contains guideways 31 on each side wall 27 to slidably receive the scraper tray. The top struts 32 are provided to impart additional rigidity to the housing structure. In the bottom portion of the housing and spaced rearwardly of the front wall are cross support 33 and lengthwise supports 34 extending to the back wall. These supports impart rigidity to the housing and receive the drawer on their upper surface when it is inserted into the housing. As shown, the side walls of the housing contain a recess for providing a handhold in order to facilitate lifting.

The drawer containing the pollen trap is shown in FIG. 4 and includes a front wall formed of the exterior cover 35 and the internal sealing member 36 adjacent thereto. The cover 35 extends across the front wall of the housing when the drawer is in place while sealing member 36 extends between the internal surfaces of the sidewalls 27 of the housing. Opposing side walls 39 are fastened to sealing member 36. Each side wall 39 contains a support 38 of reduced height adjacent sealing member 36 which is adapted to receive wooden cleat 70. Wall 51 is positioned between sidewalls 39 and is spaced from sealing member 36 to form a passageway therebetween which can be closed by placing the cleat onto supports 38.

At the rear of the drawer, cross member 41 is fastened to the ends of side walls 39. As shown, the cross member 41 has a reduced height compared to the side walls and has a rear facing chamfer. Cross piece 40 having a mating wedgeshaped lower edge resides on the chamfer surface of cross member 41. Cross piece 40 is affixed to the rear member 44. Rear member 44 along with side members 43 and front member 52, form the rectangular support for the foraminous upper surface 45 of the pollen trap. The trapped pollen passes through this surface when it is dislodged from the bees as will later be described.

The rectangular support for the upper surface is held in position by a pair of retaining pins 48 extending through sidewalls 39 and into front member 52. Removal of the pins permits the rectangular support to be removed to permit access to trapped pollen. In addition, removal of the pins enables the rectangular support to move to an inclined position with front member 52 resting on the bottom screen surface 46. The movement of the upper surface and its support structure to the inclined attitude is due to the rotational movement of cross piece 40 on the chamfer of cross member 41. If desired a hinged connection can be provided therebetween.

When inclined as mentioned, the pollen trap can be used as a food and water source for the bee colony by placing a tray of water or food supplement within the pollen trap. The tray rests on the fine mesh screen 46 that forms the bottom of the trap. While it is urged that a mesh screen be utilized as the floor of the pollen tray to provide good ventilation, it is recognized that a solid base can be utilized in some applications.

The length of the drawer structure containing the pollen trap is less than the depth of housing 20 or the length of its sidewalls 27 in order to provide a passageway for bees therebehind. Thus, passageways are provided in front of and in back of the pollen trap. When the drawer is inserted into the housing it slides on supports 33 and 34 and sealing member 36 extends vertically to the adjacent edges of the lower guideways.

Access by the bees to the forementioned passageways adjacent the centrally located pollen trap can be regulated by the use of the overlying scraper means and by the use of removable cleat 50. The scraper means shown in FIGS. 5 and 6 is slidably mounted between the guideways 31 of housing 20 and is dimensioned to extend between the rear wall 28 of the housing and the outer surface of the front wall thereof. The scraper means is capable of being withdrawn partially or fully. When fully withdrawn, the scraper means can be turned over or reversed end for end and reinserted for different operations at different locations in the colony.

As seen in FIG. 5, the scraper means includes a base member 60 which is dimensioned to fit between the guideways 31 of housing 20 and extend between the sidewalls and the front and rear wall thereof. The base member 60 is provided with a central opening 61 that is covered with a wire mesh screen 65. Two spaced longitudinal supports 62 extend across opening 61. A corrugated pollen tray 68 is shown with the channels formed by the folds and ridges extending from front to rear of the scraper means. The tray is affixed to supports 62 and is therefore spaced by the thickness thereof from the opening. This spacing is required to be relatively close to the central opening 61 to insure that the bees passing through the screen travel along the channels formed by the folds of the corrugations of tray 68. The ridges of the corrugations reduce the lateral movement of the bees as they travel to and from the supers. A fixed blocking member 63 having a height approximately equal to a guideway 31 on housing 20 is mounted on base member 60 at one edge thereof.

In FIG. 6, the scraper means is shown in a rotated position with the wire mesh screen 65 retained in position by edge members 64 and longitudinal supports 67 affixed to transverse elevating strips 66. A beveled rear sealing strip 69 is shown extending between edge members 64 at the rear edge of base member 60. The transverse spacing and height of the edge members 64 is made approximately equal to the spacing between and the height of the guideways 31 on the side wall of the housing. The insertion of the scraper means in housing 20 in the position shown in FIGS. 5 or 6 results in blocking member 63 occupying the space between the adjacent guideways 31, the base member 60 and either support 29 or sealing member 36. Also, a portion is normally removed from one edge of blocking member 63 to provide a gap which permits the ingress and egress of the larger size drone bees to the colony without their having to encounter the scraper means.

Figure 8:
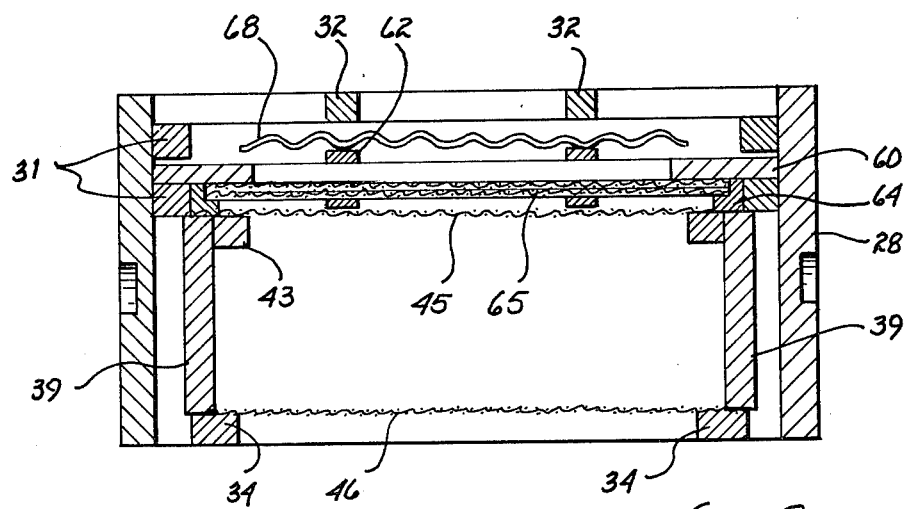
FIG. 8 is a front view in section taken along line 8—8 of FIG. 7.
Figure 9:
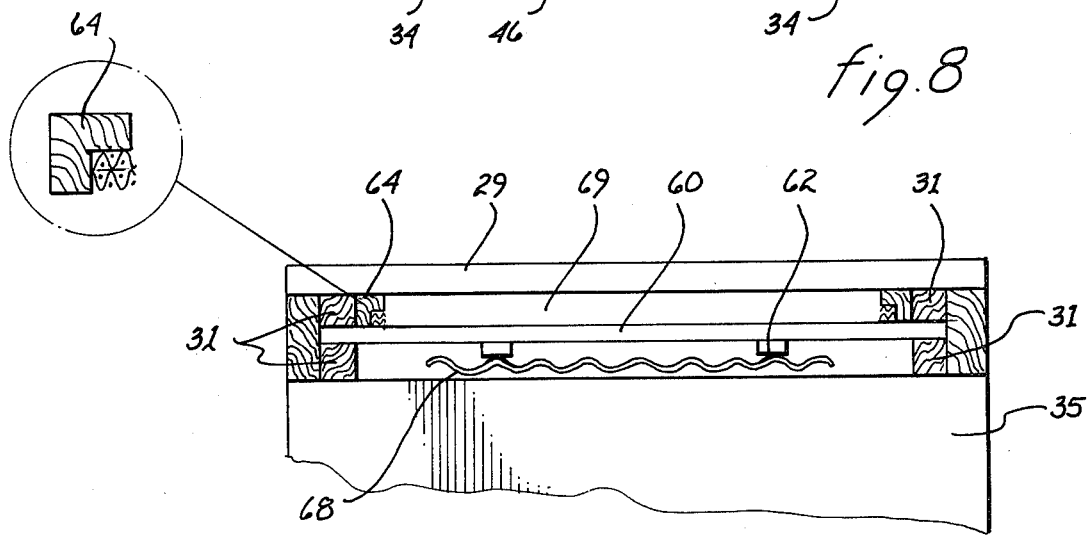
FIG. 9 is a partial front view of the housing of FIG. 7 with the scraper means inserted therein for pollination enhancing operation.

When the scraper means is inserted in the housing in overlying relationship to the pollen trap drawer as shown in FIGS. 8 and 9, the edge members 64 extend downwardly to be next to the top surfaces of the side walls 39 and thereby prevent the passage of bees therebetween. If the trap is utilized on the base structure of FIG. 3 in the bottom trapping position, pollen tray 68 acts as a trash barrier to prevent the cleaning activities of the bees in the overlying super and hive segments from causing debris to impinge on mesh screen 65 and possibly pass through into the pollen trap and contaminate previously trapped pollen.

The withdrawal, rotation and replacement of the scraper means to the position shown in FIG. 9 results in the blocking member 63 effectively closing off the entry between the guideways 31 and the front wall support 29.

In both the first and second positions of the scraper means as oriented in FIG. 9, the rear sealing strip 69 is located at the rear wall of housing 20 and does not provide by itself any sealing function between the front and rear passageways. However, in the other orientation shown in FIG. 8, a partial withdrawal of the scraper means to the second position results in the rear sealing strip being placed next to the top surface of back support 40 to prevent the passage of bees through the scraper means. In this position, a locking pin is inserted through hole 72 in the scraper means into receiving hole 49 of the drawer. The use of the locking pin is to both insure proper registration and to prevent any untended disturbance of the operation of the pollen trap.

Figure 7:
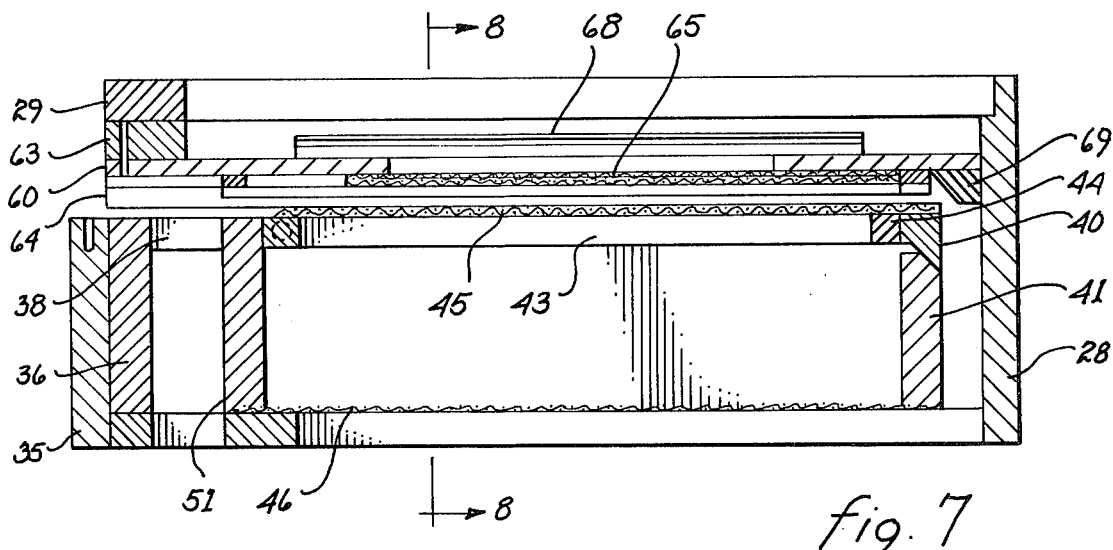
FIG. 7 is a side view in section of the housing.

The apparatus is shown assembled in the section views of FIGS. 7 and 8 wherein the cooperation between housing, drawer, pollen trap, pollen tray and reversible scraper means is described in terms of the trapping, non-trapping and pollination enhancing functions. In the situation where trapping is desired and the apparatus is placed directly on the base structure of FIG. 4 in the bottom trapping position, the bees enter through the base structure and the scraper means is fully inserted. In this position, the blocking member 50 is inserted between edge members 64 so that the bees enter through the base opening. The bees travel upward to the super and hive segments through the front and rear passageways adjacent the pollen trap contained in the drawer. In order to continue to travel upward, they must crawl through the mesh 65 of the scraper means which in most applications is comprised of two adjacent mesh screens slightly offset. When crawling through the screens, the pollen is dislodged from their bodies and falls through the openings in upper surface 45 of the pollen trap. The bees then pass along the folds of pollen tray 68 to the front and rear edges thereof whereupon they ascend to the supers stacked above.

In the testing of the preferred embodiment it was found that the pollen yield tended to decrease with the time due to the bees gaining the ability to more easily travel through the screen. Consequently, the adjacent mesh screens preferably are not fixedly mounted on the scraper means in order that they may be moved relative to each other to change the shape and size of the openings. After adjustment, the pollen yields were found to have improved.

To utilize the non-trapping mode in this bottom trap position in the colony, the blocking cleat 50 is removed from its position about the base 60 between edge members 64 and placed in the base entryway as shown in FIG. 3 to deny the bees access thereto. The scraper means is either partially withdrawn to the second position, withdrawn and rotated prior to reinsertion or removed completely from the housing. The bottom-trapping position has the advantage of not altering the flight path while trapping. While many beekeepers utilize bottom trapping, preferences vary and the equipment, for example integral base colonies, require different placement in the segmented colony.

Pollination enhancement occurs with end to end reversal and rotation of the scraper means with the blocking member 63 positioned at the rear of the trap. The orientation is as shown in FIG. 9 with the pollen tray 68 underlying base member 60. In this mode of operation, the blocking member 50 is inserted into the front opening of the colony supporting base so that bees enter and leave the hive through the front wall of the pollen collecting apparatus. The bees must pass through the screens and the pollen dislodged therefrom is retained on the pollen tray 68 which is characterized by having defined travel paths for the bees. This pollen is concentrated in the travel paths or folds of the corrugated tray. Additional pollen can be added to the tray by removing previously trapped pollen from the pollen container and pouring it on to the pollen tray through the screens. When the bees exit the hive, they pass along these elongated reservoirs of pollen so that the body of the bee has pollen adhering thereto. As these bees go into the field, they carry out the pollination necessary for agricultural production.

By utilizing a corrugated scraper tray 68 with the folds extending front to rear and being closely spaced to the base member 60 the normal exit path for the bees is via these pollen reservoirs. The importance of establishing the travel paths along the elongated pollen reservoirs is noted from tests wherein a flat pollen tray has been utilized. In the case of the flat tray where the pollen is essentially evenly distributed, the bees were found to establish a limited number of paths and thus, the bulk of the pollen remained undisturbed. The bees apparently selected the paths of least effort to exit the hive so that most of the previously deposited fresh pollen was not utilized.

In practice, the tray is mounted so that the tops of the ridges are about one-eighth of an inch from the adjacent surface of the base member. Since the bees travel along the folds through the pollen contained therein to exit from the colony, the placement of pollen in the folds causes each bee to contact the loose pollen with his body and thus each bee has the potential for becoming a pollinating agent for agricultural purposes. This is due to the fact that bees in general are hirsute creatures and their body exterior is capable of serving as a pollen carrier. Previously, it was recognized that only those bees charged with the mission of obtaining pollen for the colony were primary agents in effecting crop pollination.

Also, pollen has an effective life measured in hours out in the field and it is important to an effective pollination program that the placement of the pollen tray in the upper position to serve as a trash barrier or in the lower position to serve as the controlled exit means for bees through pollen be coordinated with the crop, the climate and the time of day. A major advantage of the present invention resides in the ability of the pollen tray when in the lower position to retain pollen dislodged from bees working their way upwards through the screen. This fresh pollen supply is available for bees exiting from the colony so that the freshest pollen is available as the most likely supply of pollen for crop pollination thus increasing the effectiveness of the colony for agricultural purposes. In addition, it has been observed that the use of the scraper means and pollen tray results in less pollen being carried into the supers of the colony with the result that increasing numbers of bees are caused to be engaged in pollen gathering. This increases the amount of fresh pollen available for bees later exiting from the hive.

The middle trapping position is used when the base structure is affixed to the bottom segment, typically the brood chamber. In this mode of operation, a blocking member 50 or the equivalent is utilized to deny access through the base structure. The present invention is positioned at the desired level in the colony with the scraper means oriented either as shown in FIG. 8 or as shown in FIG. 9 depending on whether the pollen gathered is to be trapped or retained on the tray 68. For use with the pollen trapping drawer, the scraper means is partially withdrawn to and fastened in its second position a blocking cleat 70 placed in the drawer as shown in FIG. 3 to block the first passageway. Thus, the bees enter between the front wall 35, 36 of the drawer and the base 60 of the scraper but are required to climb upward through the mesh screen 65 due to the confining action of the edge members 64 at the sides and the rear sealing strip 69. The bees can travel directly upward and can pass downward via the second or rear passageway formed between the back wall 28 of the housing and cross members 40 and 41 and sealing strip 69.

Non-trapping in the middle position can be readily provided by either withdrawing scraper means 22 completely from the housing or turning it over and returning it to the second or partially withdrawn position and removing the wooden cleat 70. The bees enter above the base 60 and can go directly upward or pass down through the aforementioned first and second passageways. To utilize the invention in its pollinating mode of operation with the pollen tray in the middle position with the orientation of FIG. 9, the scraper means is turned over and inserted with blocking member 63 toward the rear of the housing 20. The scraper means is partially withdrawn to the second or pinned position and the wooden cleat is placed in the drawer. The bees enter below the base member 60 and travel upward through the scraper means causing the dislodged pollen to deposit on the pollen tray with the folds receiving a substantial amount. The bees travel vertically throughout the colony via the second or rear passageway. When they exit the colony, the bees travel downwardly through the scraper along the folds of the corrugated scraper tray thereby encountering the fresh pollen therein which is carried off on their bodies.

Top-trapping operations with the present invention placed at the top of the colony are preferred when the colonies are to be frequently moved. Colonies are normally not moved with the pollen trapping apparatus on and in position and the top position facilitates servicing and removal. To utilize this invention in the top position in its trapping mode of operation, the second or partially-withdrawn position and orientation of the scraper means 22 and wooden cleat 70 is the same as for middle trapping. Non-trapping is provided in this position by placing the scraper means in the fully inserted or first position and removing the cleat whereupon the bees have downward access through the first and second passageways.

When located on the top of the colony, the pollen tray is rendered effective by placement as shown in FIG. 9 with pollen tray 68 below the screens and blocking member 63 located at the back of the drawer. The scraper means is placed in its partially withdrawn or second position so that the bees move upwardly through the screen and downwardly through the second passageway. The first passageway is closed by the placing of cleat 70 at the front of the drawer.

In all three positions the use of a removable wooden cleat permits the pollen trap to be effectively sealed during periods of chemical spraying. A second cleat used at the bottom results in the shutting-in of the entire colony. Since pollen storage is in the drawer at the central region of the colony with adequate ventilation provided, the present invention results in reduced spoilage of the entrapped pollen. And the trap is elevated in this position to further reduce spoilage from ground moisture and the trapped pollen is not subject to contamination by small animals.

The ability to perform the trapping, non-trapping and pollination-enhancing operations in any position within the segmented bee colony is particularly important since the operator cannot continually trap and deprive his bee colonies of the pollen they need for sustenance. Consequently, the trapping and non-trapping is alternated frequently. Heretofore, this has required skilled labor to continually rearrange the stacked segments for prior internally situated pollen traps. The present pollen trapping structure permits rapid conversion from one type of operation to the other with substantial savings in time and labor.

While the foregoing has referred to a particular embodiment of the invention, it is recognized that many modifications and variations may be made therein without departing from the scope of the invention as set forth in the claims.

I claim:

1. Pollen trapping apparatus for placement at different levels in a segmented bee colony, said apparatus comprising:
   (a) a housing having a front wall, opposing side walls and a back wall for insertion in a segmented bee colony, said housing being dimensioned to fit within the segmented colony;
   (b) means mounted in said housing for forming first and second bee passageways therein proximate to the front and back walls of said housing; said means including a pollen trap contained within said housing and being spaced from the front and back walls thereof, said trap having a foraminous upper surface to permit the passage of pollen therethrough;
   (c) means for controlling access to said first passageway;

(d) reversible scraper means movably mounted in said housing and being dimensioned to extend between the front and back walls thereof, said means containing a screen and being positioned in overlying relationship to said bee passageways for removing the pollen from bees passing through said screen, said scraper means being movable between first and second positions to control access to the second bee passageway;

(e) a pollen tray mounted on one side of said scraper means and closely spaced adjacent said screen, the reversal of said scraper means placing said pollen tray beneath said screen whereby pollen removed from the bees is retained on the pollen tray; and (f) an access control member affixed to said scraper means and extending thereacross proximate to the back wall of said housing when in said first position, the control member extending between the scraper means and pollen trap when in the second position to control access to the second bee passageway.

2. Apparatus in accordance with claim 1 wherein said pollen tray is provided with means for defining the travel paths of bees.

3. Apparatus in accordance with claim 2 wherein said pollen tray is at least as large as the screen of said scraper means.

4. Apparatus in accordance with claim 1 wherein said pollen tray is corrugated in cross-section with alternate ridges and folds, said ridges and folds extending in a direction from front to back of said housing when the scraper means is inserted therein.

5. Apparatus in accordance with claim 4 further comprising longitudinal support means affixed to the scraper means for the attachment of said pollen tray thereto.

6. Apparatus in accordance with claim 1 wherein said scraper means contains an entry blocking member extending thereacross proximate to the front wall of said housing.

7. Apparatus in accordance with claim 6 wherein the housing includes guideways extending along the sidewalls to receive said scraper means.

8. Apparatus in accordance with claim 7 wherein said scraper means is a substantially planar member having a centrally located foraminous portion therein.

9. Apparatus in accordance with claim 7 wherein the entry blocking member of the scraper means extends between said guideways adjacent to the front wall of said housing member when the scraper means is in the first and second positions.

10. Apparatus in accordance with claim 9 wherein said scraper means is movably mounted in said housing to permit complete withdrawal therefrom and reinsertion in a rotated position whereby the entry blocking member can be utilized to deny entry above and below the scraper means.

11. Apparatus in accordance with claim 10 wherein said scraper means includes retaining means for receiving a blocking member placed within the front wall of the housing member to thereby deny entry concurrently above and below the scraper means.

12. Apparatus for collecting and distributing pollen, and for placement at different levels in a segmented bee colony, said apparatus comprising:

(a) a housing for insertion in a segmented bee colony and having a front wall;

(b) pollen collection means movably mounted in said housing for receiving pollen and bounding at least one vertical bee passageway adjacent thereto;

(c) reversible scraper means movably mounted in the front wall of said housing, said means being spaced from adjacent portions of said front wall and being positioned in overlying relationship to said bee passageway for removing the pollen from bees passing there through;

(d) a pollen tray mounted on one side of said scraper means and adjacently spaced thereto, the reversal of said scraper means placing said pollen tray beneath said scraper means and above said collection means whereby pollen removed from the bees is retained on the pollen tray; and (e) means for controlling access to said bee passageway.

13. In a pollen collection device for use in a segmented bee colony of the type wherein a housing has a front wall opening therein to permit the insertion of reversible scraper means into a bee passageway for the removal of pollen from bees passing therethrough, the improvement comprising:

(a) guide means within said housing for removably receiving said scraper means, and positioning said scraper means in the bee passageway, said guide means spacing said scraper means in the front wall opening from the adjacent portions of the front wall;

(b) said reversible scraper means containing a screen for removing pollen from bees passing therethrough, and (c) a pollen receiving tray mounted on one side of said scraper means and closely spaced adjacent thereto, the placement of said scraper means within said housing with the tray beneath said screen resulting in said tray receiving pollen removed from bees entering the colony, said pollen tray being closely spaced adjacent said screen so that bees exiting the colony pass through the received pollen thereon whereby dissemination of pollen outside the hive is enhanced.

14. The improvement of claim 13 further comprising a pollen trap contained within said housing beneath said scraper means, the placement of said scraper means within said housing with the tray thereabove resulting in said trap receiving pollen removed from bees entering the colony.

* * * * *